May 31, 1960

G. A. FEDDE 2,939,089

SIGNAL GENERATING CIRCUIT

Filed Jan. 6, 1958

INVENTOR.
GEORGE A. FEDDE

BY Robert D. Sanborn

ATTORNEY 2,939,089

SIGNAL GENERATING CIRCUIT

George A. Fedde, Hatboro, Pa., assignor to Philco Corporation, Philadelphia, Pa., a corporation of Pennsylvania Filed Jan. 6, 1958, Ser. No. 707,373

10 Claims. (Cl. 331—158)

The present invention relates to reference signal generator circuits and more particularly to circuits for generating a signal of predetermined frequency and phase in response to intermittent bursts of an oscillatory signal.

In color television broadcasting color subcarrier phase reference information is relayed from the transmitter to the receiver by superimposing a short burst of the color subcarrier signal, known as the color burst, on each horizontal blanking pulse. Since this reference signal is a periodic series of short bursts, the frequency spectrum of this signal contains the desired fundamental frequency and several large amplitude sidebands. These sidebands are spaced from the desired subcarrier fundamental by the repetition frequency of the bursts, i.e. by the horizontal scanning frequency.

The circuits at the receiver for recreating from the color bursts a subcarrier signal of reference phase must be capable of responding to the fundamental component of the color burst while at the same time discriminating against the sideband components. Various circuits have been proposed in the past for generating the desired subcarrier frequency signal. Typical examples of prior art circuits are reactance tube oscillator circuits controlled by phase detectors, and crystal or other high Q filter circuits followed by amplitude limiters. In general the circuits of the prior art have suffered from one or more of the following disadvantages; undue complexity, insufficient discrimination against sidebands of the color burst signal, or insufficient phase and frequency stability. The circuits employing a filter followed by a limiter suffer from the particular disadvantage that extremely good amplitude limiting is required to eliminate the natural decrement of the signal in the interval between bursts.

Therefore it is an object of the present invention to provide a simple, novel, signal generator circuit which is capable of being synchronized by short bursts of a reference signal.

Another object of the present invention is to provide a highly stable signal generator circuit which provides a high degree of discrimination against harmonics in the synchronizing signal.

A further object of the present invention is to provide a novel circuit in which the same frequency sensitive element controls both the frequency of the generated signal and the selection of the synchronizing signal.

Still another object of the present invention is to provide a subcarrier signal generator for a television receiver or the like which requires no amplitude limiter circuits.

These and other objects of the invention are achieved by providing a novel circuit which employs a single crystal but which functions both as a crystal filter circuit and as a crystal controlled oscillator circuit. For a better understanding of the invention reference should now be made to the following detailed description which is to be read in conjunction with the accompanying drawings in which.

Figure 1:
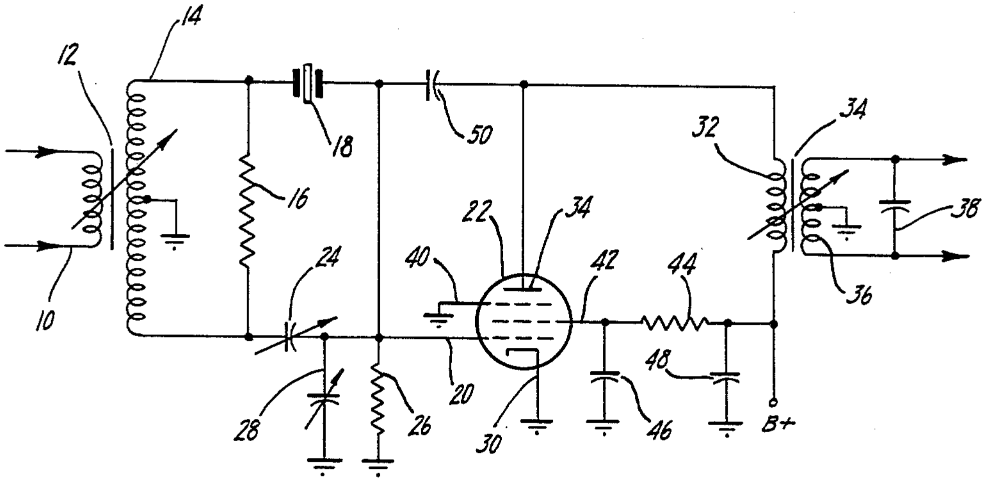
Fig. 1 is a schematic diagram of one preferred embodiment of the invention.

In Fig. 1 the source of synchronizing signal is represented by transformer winding 10. Winding 10 forms a primary winding of transformer 12 which is also provided with a center tapped secondary winding 14. Transformer 12 may be so constructed that the coupling between primary winding 10 and secondary winding 14 may be varied to adjust the amplitude of the synchronizing signal to an optimum value. For reasons which will appear presently the center tap of winding 14 is returned to ground.

Secondary winding 14 is shunted by a resistor 16. In a typical circuit this resistor may have a value of approximately 300 to 400 ohms. A piezoelectric crystal 18 is connected between one terminal of resistor 16 and a control grid 20 of a multigrid vacuum tube 22. A capacitor 24 which has a capacitance substantially equal to the holder capacity of crystal 18 is connected between the second terminal of resistor 16 and control grid 20. Capacitor 24 may be made adjustable if desired to facilitate matching its capacitance to the effective holder capacitance of crystal 18.

A resistor 26 is connected between grid 20 and ground to provide the necessary D.-C. path from grid 20 to ground. Preferably resistor 26 has a resistance which is large compared to the resistance of resistor 16. Typically resistor 26 may have a value of the order of 100,000 ohms. Resistor 26 is shunted by a capacitor 28 which is one of the frequency determining elements of the oscillator circuit.

As shown in Fig. 1, the cathode 30 of tube 22 is connected to ground. The anode circuit of tube 22 includes the primary winding 32 of a transformer 34 which also includes a secondary winding 36. One end of primary winding 32 is connected to the anode 34 of tube 22 and the other terminal of winding 32 is connected to the positive terminal of the anode supply source represented by the symbol B+ in Fig. 1. The secondary winding 36 of transformer 34 is shunted by a capacitor 38. Capacitor 38 has a value such that the secondary circuit is resonant at a frequency slightly above the desired frequency of oscillation of the signal generator circuit. Preferably transformer 34 is so constructed that the coupling between primary winding 32 and secondary winding 36 may be adjusted. It will be seen by those skilled in the art that the impedance reflected into the anode circuit of tube 22 will be a function of the coupling between primary winding 32 and secondary winding 36.

The suppressor grid 40 and screen grid 42 of tube 22 are connected in conventional fashion. Suppressor grid 40 is returned to ground and screen grid 42 is maintained at a fixed positive potential lower than the anode supply potential by means of a voltage dropping filter circuit comprising resistor 44 and capacitors 46 and 48. A feedback capacitor 50 is provided between the anode 34 of tube 22 and the grid 20 of this tube.

The circuit of Fig. 1 generates a continuous signal of constant amplitude which has a frequency equal to the fundamental component of the synchronizing signal supplied to primary winding 10 and a phase which is directly related to the phase of the fundamental component. The generated signal appears at secondary winding 36 of transformer 34. In a subcarrier generator circuit of a television receiver it is usually desirable to provide a balanced output from the subcarrier generator circuit. This is accomplished in the circuit of Fig. 1 by grounding the centertap of winding 36.

The circuit of Fig. 1 generates the continuous output signal of the desired frequency and phase in the following manner. Capacitor 24 is adjusted so that it just balances the holder capacity of crystal 18. For reasons which will be explained presently capacitor 28 is adjusted so that the series resonant frequency of crystal 18 is slightly below the frequency of the fundamental component of the synchronizing burst supplied to winding 10. Resistor 16 is selected to have a value such that the passband of the circuit is broad enough to include the desired fundamental component of the synchronizing burst even though crystal 18 has been made resonant at a slightly lower frequency. However the selectivity of the circuit is still sufficiently high to exclude all sidebands of the synchronizing burst.

This selection of the fundamental and exclusion of the sidebands is accomplished as follows. At the frequencies of the sidebands of the synchronizing bursts which are remote from the resonant frequency of crystal 18, crystal 18 appears as a high impedance. Therefore the impedance between the upper end of resistor 16 and grid 20 is essentially the holder capacitance of crystal 18. It will be seen that the signal coupled to the grid of tube 20 by way of the upper half of winding 14 and the holder capacitance of crystal 18 is exactly balanced and effectively cancelled by an equal but oppositely phased signal supplied by way of the lower half of winding 14 and capacitor 24. Thus no net signal corresponding to the sideband components of the synchronizing bursts is supplied to grid 20.

At the frequency of the fundamental component, which is only slightly removed from the series resonant frequency of crystal 18, crystal 18 appears as a low impedance. Therefore, at this frequency, a signal is supplied by way of the upper half of winding 14 and the low impedance of crystal 18 to the grid of tube 20 which is not balanced by a signal supplied by the way of the lower half of winding 14 and capacitor 24. As a result, a signal at the fundamental frequency of the synchronizing burst will appear across resistor 26. That is, it will appear between the grid 20 and cathode 30 of tube 22. This fundamental component will be amplified by the circuit which includes tube 22.

Turning now to the anode circuit of tube 22, secondary winding 36 and capacitor 38 form a tuned circuit which is resonant at a frequency higher than that of the fundamental component of the synchronizing burst. Thus at the frequency of the fundamental component circuit 36–38 will appear as an inductive impedance. This inductive impedance is reflected into the primary circuit of transformer 34. The value of this reflected impedance can be controlled by adjusting the coupling between primary winding 32 and secondary winding 36.

Capacitor 50 provides a feedback path from anode 34 to grid 20. If the grid-cathode circuit of tube 30 is also inductive the feedback from anode to grid will be in proper phase to reinforce the signal supplied to grid 20 from primary winding 10. It can be shown that, viewed from the grid of tube 20, capacitor 28 and resistor 26 are shunted in effect by a series circuit comprising crystal 18 and an equivalent resistor having a resistance equal to one-fourth the resistance of resistor 16. If crystal 18 is tuned by capacitor 28 so that the desired fundamental frequency lies between the series resonant frequency and the slightly higher parallel resonant frequency of crystal 18, the impedance of the grid-cathode circuit will appear to be inductive.

The amount of feedback in the circuit shown is dependent upon the effective inductance in the anode circuit of tube 22 and the value of capacitor 50. Thus, by properly adjusting the values of these impedances, the circuit may be adjusted so that the amplitude of the generated signal appearing across winding 36 decreases only slightly in the interval between bursts of synchronizing signal supplied to winding 10. Alternatively the feedback may be increased to the point at which the circuit will oscillate. The circuit then becomes self-limiting. If the feedback is not made too great the signal generated by the circuit will have a phase directly related to the phase of the signal supplied to primary winding 10. The frequency of the generated signal is maintained at the proper value by the synchronizing effect of the input signal and the well known frequency stabilizing effect of crystal 18.

Circuits employing tubes with shielding grids between the anode and grid of the tube generally require an external capacitor 50. If a triode tube is employed the internal plate to grid capacitance of the tube may be sufficiently high to make an external feedback capacitor unnecessary.

Figure 2:
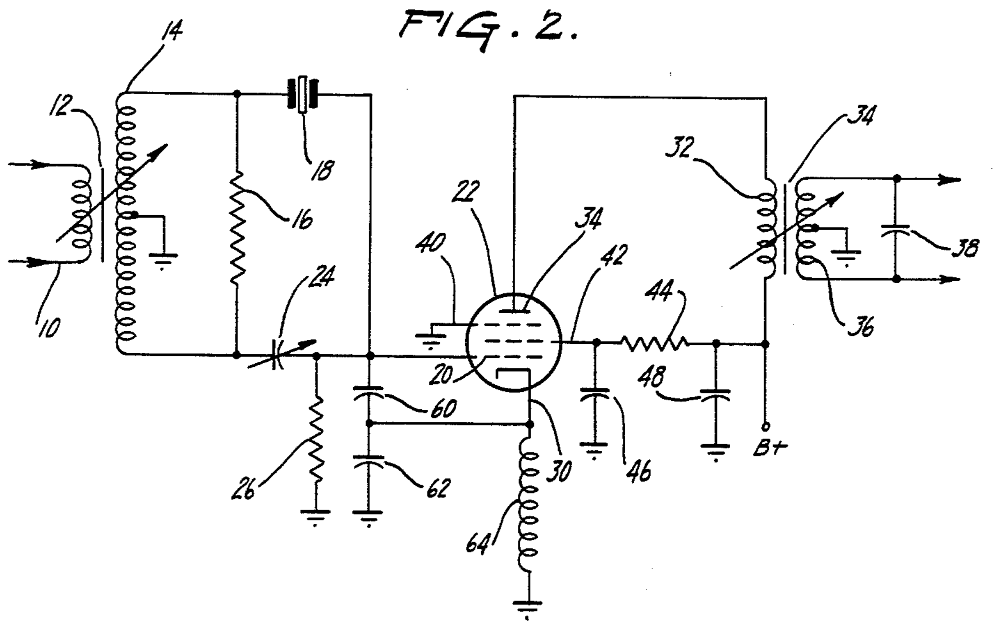
Fig. 2 is a schematic diagram of a second preferred embodiment of the invention.

The embodiment of Fig. 2 is a modification of the embodiment of Fig. 1. Parts in Fig. 2 corresponding to like parts in Fig. 1 are identified by the same reference numerals. In Fig. 2 capacitor 50 is omitted and capacitor 28 is replaced by two series connected capacitors 60 and 62. A choke 64 is connected between cathode 30 of tube 22 and ground. Choke 64 is sufficiently large to isolate cathode 30 from ground at the frequency of the signal to be generated. Cathode 30 is also connected to the junction of capacitors 60 and 62.

The circuit from transformer winding 10 to the grid 20 of tube 22 in Fig. 2 functions in much the same manner as the corresponding circuit of Fig. 1. In Fig. 2 the crystal 18 resonates with the circuit comprising capacitors 60 and 62 and inductor 64 at the fundamental frequency of the synchronizing burst which appears across resistor 26. It will be seen that the grid-cathode circuit of tube 22 is connected across capacitor 60 while the cathode to ground circuit is connected across capacitor 62. Thus the feedback to the grid-cathode circuit will be in a direction to cause regeneration. The value of capacitor 60 may be selected so that the amplitude of the signal appearing across winding 36 decreases only slightly between successive synchronizing bursts. Alternatively the value of capacitor 60 may be increased to the point where the circuit oscillates and hence becomes self-limiting.

In the circuit of Fig. 2 screen grid 42 acts as an anode for the amplifying portion of the circuit since it is maintained at signal ground potential by capacitor 46. Since anode 34 is no longer in the feedback circuit the impedance reflected into the primary winding 32 by the tuned secondary circuit of transformer 34 no longer affects the operation of the circuit just described. Therefore the circuit 36–38 may be tuned to the frequency of the signal generated by the circuit to provide an output signal of slightly increased amplitude.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A signal generating circuit comprising a regenerative amplifier stage including an amplifier element having an input connection, an output connection and a connection common to the input and output circuits of said amplifier stage, resonant circuit means having first and second portions with electrical coupling between said portions, said first portion being connected between said input connection and said common connection, said second portion being connected between said output connection and said common connection, a piezoelectric crystal forming the inductive element of one of said portions, first and second control terminals to which a source of two oppositely phased synchronizing signals may be connected, said piezoelectric crystal being electrically connected between said first terminal and said input connection, and means having an impedance substantially equal to the non-resonant impedance of said crystal connected between said second terminal and said input connection.

2. A signal generating circuit as in claim 1 wherein said coupling between said portions is sufficient to cause said amplifier stage to generate sustained oscillations.

3. A signal generating circuit comprising a regenerative amplifier stage including an amplifier element having an input connection, an output connection and a connection common to the input and output circuits of said amplifier stage, tuned circuit means comprising a series string of capacitive elements and a piezoelectric crystal electrically connected thereacross for parallel resonance, said piezoelectric crystal providing at least a major portion of the inductance of said circuit, means electrically connecting first and second terminals of said series string of capacitive elements to said input connection and said output connection, respectively, means connecting a point on said series string of capacitive elements intermediate said first and second terminals to said common connection, first and second control terminals to which a source of two oppositely phased synchronizing signals may be connected, said piezoelectric crystal being electrically connected between said first control terminal and said input connection, and means having an impedance substantially equal to the non-resonant impedance of said crystal connected between said second control terminal and said input connection.

4. A signal generating circuit comprising a regenerative amplifier stage including an amplifier element having an input connection, an output connection and a connection common to the input and output circuits of said amplifier stage, first resonant circuit means connected between said output connection and said common connection, second resonant circuit means connected between said input connection and said common connection and including a piezoelectric crystal which affords at least a major portion of the inductance of said second resonant circuit means, means affording capacitive coupling between said first and second resonant circuit means, a source of synchronizing signals providing oppositely phased signals at first and second terminals thereof, said piezoelectric crystal being electrically connected between said first terminal and said input connection, and means having an impedance substantially equal to the non-resonant impedance of said crystal connected between said second terminal and said input connection.

5. A signal generating circuit comprising a regenerative amplifier stage including an amplifier element having an input connection, an output connection, and a connection common to the input and output circuits of said amplifier stage, said amplifier stage further comprising capacitive means electrically connected between said input connection and one of said other two connections at the frequency of the signals to be generated, a source of synchronizing signal having a first output terminal, a second output terminal and a common terminal, said synchronizing signal source providing synchronizing signals of opposite phase at said first and second terminals respectively, said common terminal being electrically connected to the terminal of said capacitive means remote from said input connection, a piezoelectric crystal connected between said first terminal and said input connection, said piezoelectric crystal being self-resonant substantially at the frequency of the signal supplied by said synchronizing signal source, said piezoelectric crystal and said capacitive means being resonant at a frequency approximately equal to the frequency of the signal to be generated, and means having an impedance substantially equal to the non-resonant impedance of said crystal connected between said second terminal and said input connection.

6. A signal generating circuit comprising, a source of synchronizing signal, said source having first, second and third output terminals, the signal between said first and second terminals being equal in amplitude but opposite in phase to the signal appearing between said second and third terminals, an amplifier element having at least an input connection, an output connection and a common connection, a piezoelectric crystal element connected between said first terminal of said source and said input connection, means having an impedance substantially equal to the non-resonant impedance of said crystal element connecting said third terminal to said input connection, reactive impedance means connected between said input connection and said second terminal of said source, said reactive impedance means and said crystal element being parallel resonant at a frequency approximately equal to the series resonant frequency of said crystal element, reactive circuit means including at least a portion of said reactive impedance means connected between said input connection and said common connection of said amplifier element, second reactive circuit means connected between said common connection and said output connection, and means providing energy feedback in a regenerative sense between said output connection and said input connection of said amplifier element.

7. A signal generating circuit comprising, a source of synchronizing signals, said source having first, second and third output terminals, said third terminal being connected to a point of reference potential for said circuit, the signal between said first and third terminals being equal in amplitude but opposite in phase to the signal appearing between said second and third terminals, an electron tube having at least an anode, a cathode, and a control grid, a piezoelectric crystal element connected between said first terminal of said source and said control grid, a first capacitor having an impedance substantially equal to the non-resonant impedance of said crystal element, said first capacitor being connected between said control grid and said second terminal of said source, said first capacitor and said crystal being parallel resonant at a frequency approximately equal to the series resonant frequency of said crystal element, means including a second capacitor connected between said control grid and said cathode, said second capacitor together with said crystal element, said first capacitor and said source forming a first reactive circuit having a frequency of resonance approximately equal to the frequency of the signals supplied by said source, a second reactive circuit electrically coupled between said anode and said cathode at the frequency of the signal generated by said circuit, and means providing energy feedback in a regenerative sense between the anode-cathode circuit and the grid-cathode circuit of said electron tube.

8. A signal generating circuit comprising, an electron tube having at least an anode, a cathode and a control grid, said cathode being connected to circuit ground, a transformer having a primary winding to which a source of synchronizing signals may be connected and a secondary winding having first, second and third terminals, said third terminal being connected to circuit ground, the signal appearing at said first terminal being equal in amplitude and opposite in phase to the signal appearing at said second terminal, a piezoelectric crystal element connected between said first terminal of said secondary winding and said control grid, a first capacitor having an impedance substantially equal to the non-resonant impedance of said crystal element, said first capacitor being connected between said control grid and said second terminal of said secondary winding, means including a second capacitor connected between said control grid and said cathode, said second capacitor together with said crystal element, said first capacitor and said secondary winding forming a first reactive circuit having a frequency of resonance approximately equal to the frequency of the signals supplied by said source, a second reactive circuit electrically coupled between said anode and said cathode at the frequency of the signal supplied by said source, said second reactive circuit having a frequency of resonance slightly higher than the frequency of the signal supplied by said source, and means providing energy feedback in a regenerative sense between the anode-cathode circuit and the grid-cathode circuit of said electron tube.

9. A signal generating circuit comprising, an electron tube having at least an anode, a cathode and a control grid, said cathode being connected to ground for low frequencies and isolated from ground at the frequency of the signal generated by said circuit, a transformer having a primary winding to which a source of synchronizing signals may be connected and a secondary winding having first, second and third terminals, said third terminal being connected to ground, the signal appearing at said first terminal being equal in amplitude and opposite in phase to the signal appearing at said second terminal, a piezo-electric crystal element connected between said first terminal of said secondary winding and said control grid, a first capacitor having an impedance substantially equal to the non-resonant impedance of said crystal element, said first capacitor being connected between said control grid and said second terminal of said secondary winding, second and third capacitors connected in series between said control grid and ground, the intermediate terminal of said series combination being connected to said cathode, said second and third capacitors, said first capacitor, said crystal element and said secondary winding forming a tank circuit resonant at approximately the frequency of the synchronizing signal supplied to said primary winding, and means in the anode-cathode circuit of said vacuum tube for deriving an output signal from said circuit.

10. A signal generating circuit comprising a regenerative amplifier stage including an amplifier element having an input connection, an output connection and a connection common to the input and output circuits of said amplifier stage, resonant circuit means having first and second portions with signal coupling between said portions, said first portion being connected between said input connection and said common connection, said second portion being connected between said output connection and said common connection, a piezo-electric crystal forming a reactive element of one of said portions, first and second control terminals to which a source of two oppositely phase synchronizing signals may be connected, said piezo-electric crystal being electrically connected between said first terminal and said input connection, and means having an impedance substantially equal to the non-resonant impedance of said crystal connected between said second terminal and said input connection.

References Cited in the file of this patent

UNITED STATES PATENTS

| | | |
|---|---|---|
| 2,309,083 | Usselman | Jan. 26, 1943 |
| 2,444,998 | Matthias | July 13, 1948 |
| 2,493,145 | Jaffe | Jan. 3, 1950 |
| 2,741,700 | Hall | Apr. 10, 1956 |